United States Patent [19]

Shields

[11] 4,293,063
[45] Oct. 6, 1981

[54] APPARATUS FOR INVERTING AND TRANSPORTING ARTICLES

[76] Inventor: Walter Shields, 181-41 Henley Rd., Jamaica, N.Y. 11432

[21] Appl. No.: 51,327

[22] Filed: Jun. 22, 1979

[51] Int. Cl.³ .............................................. B65G 47/24
[52] U.S. Cl. ................................... 198/404; 198/482; 198/586; 198/655; 198/796
[58] Field of Search ............... 198/402, 403, 404, 406, 198/407, 408, 420, 482, 483, 484, 586, 655, 646, 796, 801

[56] References Cited

U.S. PATENT DOCUMENTS

| | | | |
|---|---|---|---|
| 3,072,239 | 1/1963 | Jones et al. | 198/482 X |
| 3,789,802 | 2/1974 | Conley | 198/482 X |
| 3,880,294 | 4/1975 | Arseneault | 198/482 X |
| 4,067,433 | 1/1978 | Phipps | 198/404 X |
| 4,076,113 | 2/1978 | Shields | 198/480 X |

*Primary Examiner*—James L. Rowland

*Attorney, Agent, or Firm*—Jordan and Hamburg

[57] ABSTRACT

There is provided an apparatus for inverting articles and transporting the articles from a first station to a second station. The apparatus comprises conveyor means including an endless rotational member and a plurality of holding members secured to the rotational member, at least one feeding means for providing the articles to each holding member successively at the first station, receiving means for receiving the articles from the holding members at the second station, and transfer means for transferring the articles supported in the holding members to the receiving means. The rotational member is consecutively indexed to allow the holding members to substantially register with the feeding means and the receiving means when the rotational member is stopped. The orientation of the articles at the first station is different from the orientation of the articles at the second station.

12 Claims, 4 Drawing Figures

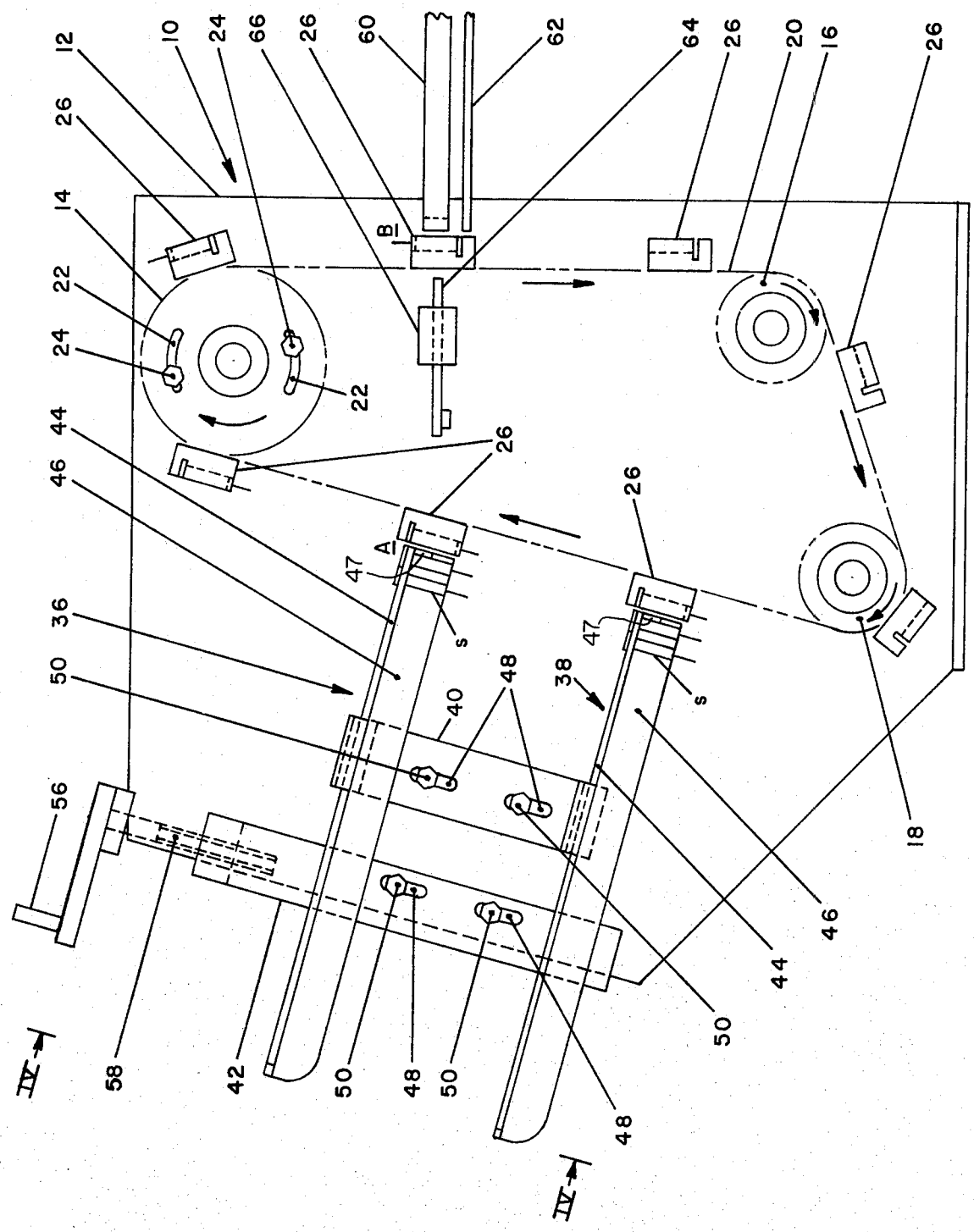
FIG. I.

APPARATUS FOR INVERTING AND TRANSPORTING ARTICLES

BACKGROUND OF THE INVENTION AND PRIOR ART STATEMENT

The invention relates to an apparatus for inverting and transporting articles, more particularly an apparatus for consecutively inverting syringe sub-assemblies and transporting the same from a first station to a second station.

The term "syringe sub-assembly" or "sub-assembly" as used herein is intended to include a syringe vial, a hypodermic needle secured to an end of the vial and an annular flange at the other end thereof, and the term "syringe" is intended to include the combination of the sub-assembly with a plunger adapted for insertion into the vial for injecting a liquid medicament. A piston may be attached to an end of the plunger for providing a seal between the vial and the plunger.

In the past, syringes were used many times and sterilized after each usage. However, syringes are now generally sold in sterilized condition and are thrown away after one usage for the purpose of eliminating the trouble of sterilization. In some cases, the syringe as sold contains the liquid medicament.

The art of assembling and sterilizing the syringes or sub-assemblies is well developed. In U.S. Pat. No. 3,588,985 and U.S. Pat. No. 3,597,826, apparatus is disclosed for uniting a plunger and a piston of a fully assembled hypodermic needle syringe, wherein the sub-assembly includes a needle sheath, the liquid medicament and the piston, and the plunger is attached to the piston by the apparatus.

U.S. Pat. No. 3,623,210 discloses that the sub-assembly is cleaned, and thereafter the needle thereof is covered with the needle sheath, so that further steps, such as filling the vial with the liquid medicament and/or inserting the plunger can be effected, which is also shown in U.S. Pat. No. 4,118,914.

In handling the sub-assemblies as stated above, the vials or sub-assemblies are arranged such that the needles thereof are pointed upwardly or downwardly for easily performing the various steps. Reorientation of the sub-assemblies may be required a plurality of times in completing the syringes.

In U.S. Pat. No. 4,076,113, there is disclosed an apparatus for simultaneously reorienting and transporting articles. The apparatus is satisfactory for changing the orientation of sub-assemblies having the needles pointed upwardly, but it is not suitable for changing the orientation thereof vice versa because a wheel having recesses for receiving the articles cannot properly support or transfer the articles to receiving means.

Therefore, an object of the invention is to provide an apparatus for inverting and transporting articles successively without limitation as to the initial orientation of the articles.

Another object of the invention is to provide an apparatus for successively inverting and transporting a plurality of articles at a time.

Further objects and advantages of the invention will be apparent from the following description of the invention.

SUMMARY OF THE INVENTION

In accordance with the invention, there is provided an apparatus for inverting articles and transporting the articles from a first station to a second station. The apparatus comprises conveyor means including an endless rotational member and a plurality of holding means secured to the rotational member, the holding members being equally spaced from each other, at least one feeding means for providing the articles to each holding member successively at the first station, receiving means for receiving the articles from the holding members at the second station, at which the orientation of the articles is different from the orientation of the articles at the first station, and transfer means for transferring the articles supported in the holding members to the receiving means. The rotational member is consecutively indexed to allow the holding members to substantially register with the feeding means and the receiving means when the rotational member is stopped.

The conveyor means is situated in a substantially vertical plane, and the first and second stations are at positions spaced across the plane. The conveyor means moves in the direction from the first station to the second station through the the uppermost location thereof by means of an indexing rotor to which the rotational member is adjustably secured.

Each holding member has two seats each supporting a respective article and arranged in side by side relationship, so that one holding member transports two articles at a time. For feeding the articles to each seat, two feeding means are provided at the first station laterally spaced from each other. Each feeding means includes a support member supporting the articles in a row and a gate member which allows feeding the article to the seat when the holding members are stopped and aligned with the support members.

Preferably, the two feeding means are spaced vertically as well as laterally such that two feeding means are respectively aligned with two holding members at a time. The feeding means are connected to each other and can be adjusted vertically for precisely aligning the feeding means with the seats of the holding members.

The receiving means includes a turret having a plurality of recesses at the outer periphery thereof to hold the articles therein and a guide ring to support lower ends of the articles. The turret and guide ring are vertically adjustable to support different size articles.

The distributing means includes a bifurcated arm to push the articles supported in the seats to the recesses of the receiving means when the holding members and recesses are aligned. The receiving means is indexed a distance corresponding to two recesses each time so that each time two recesses are positioned to receive two articles.

The apparatus of the invention is specifically designed to consecutively invert and transport syringe sub-assemblies including syringe vials having hypodermic needles secured at one end and annular flanges at the other end thereof, but it will be understood that other articles can be consecutively inverted and transported as well.

BRIEF DESCRIPTION OF THE DRAWINGS

FIG. 1 is an explanatory front view of the apparatus in accordance with the present invention;

DETAILED DESCRIPTION OF A PREFERRED EMBODIMENT

Figure 3:
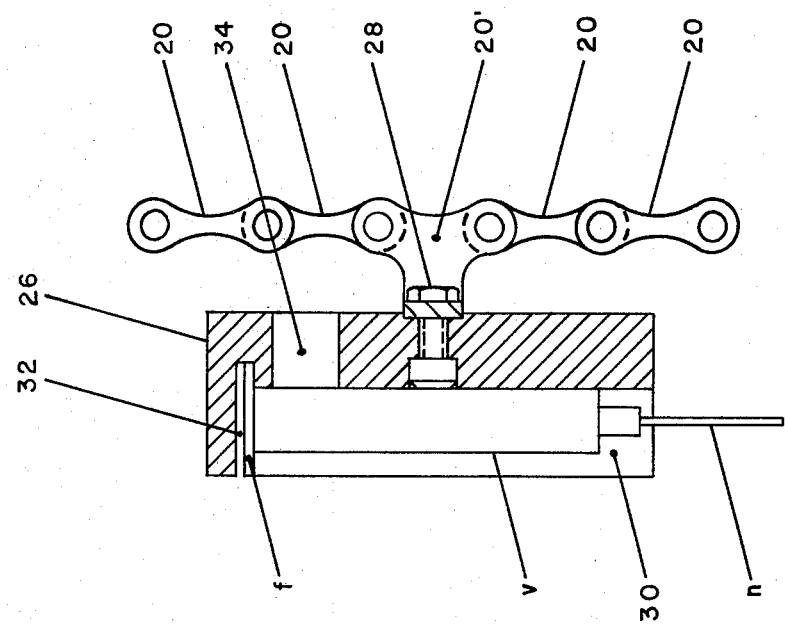
FIG. 3 is a cross-sectional view taken along the line III—III in FIG. 2.
Figure 2:
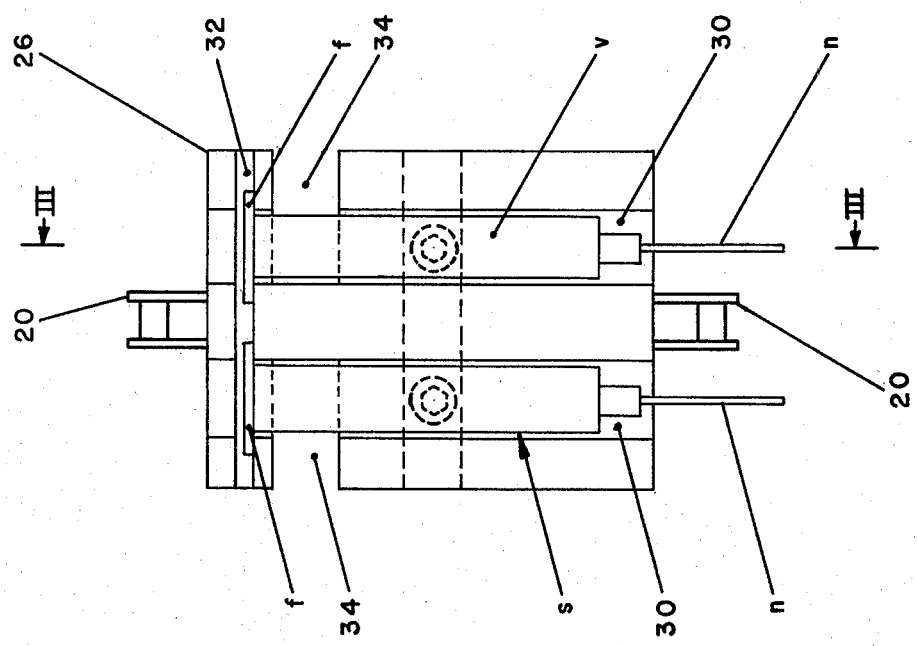
FIG. 2 is a front view of the holding member of the invention.
Figure 4:
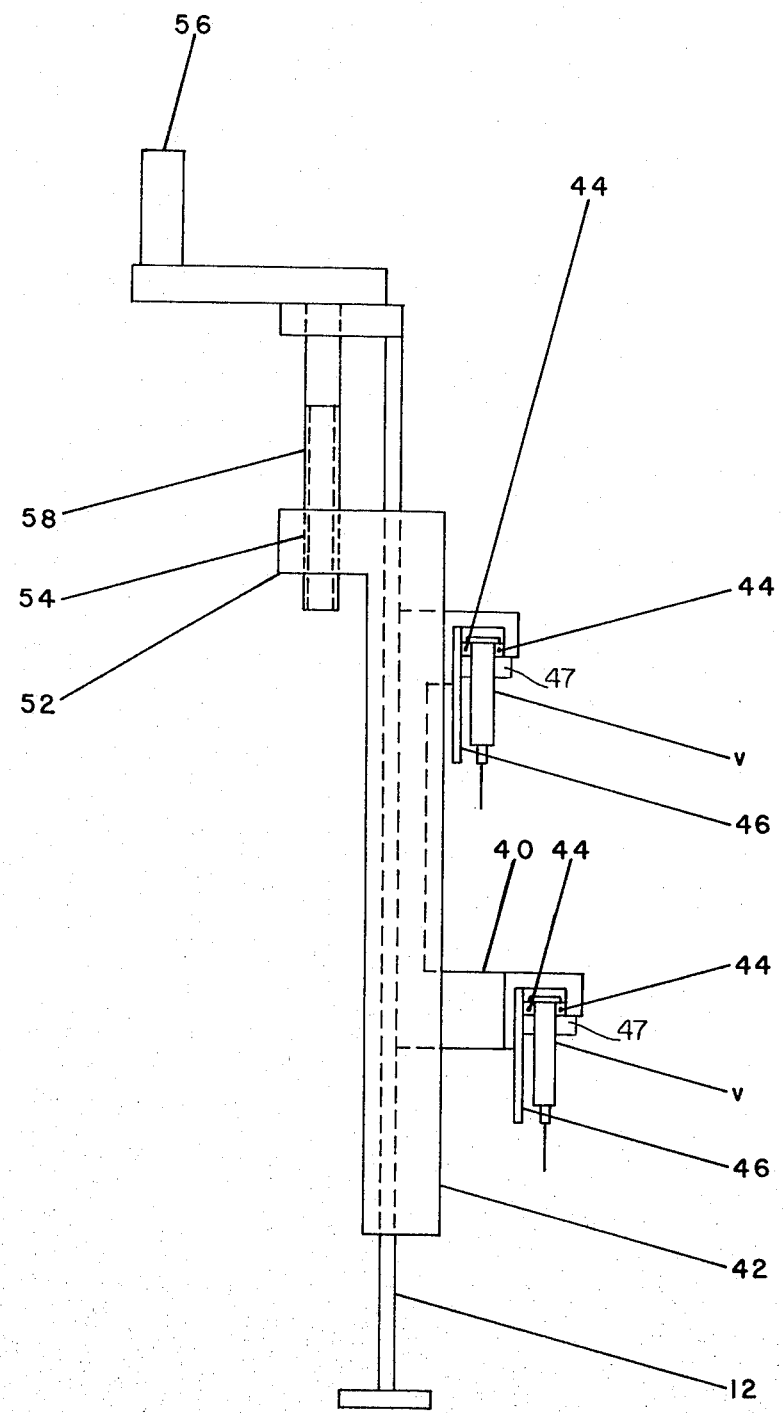
FIG. 4 is an enlarged side view taken along the line IV—IV in FIG. 1.

In accordance with the invention, an apparatus 10 is specifically intended to invert the syringe sub-assemblies s, each including a glass vial v having a flange f at one end and a hypodermic needle n at the other end thereof (see FIG. 2).

Referring to FIG. 1, the apparatus 10 having a frame 12 includes a drive sprocket 14 at an upper portion of the frame 12 and two idler sprockets 16 and 18 at a lower portion thereof, over which an endless chain 20 is trained. The drive sprocket 14 includes a pair of elongated semi-circular slots 22 through which bolts 24 extend to adjustably secure the sprocket 14 to an indexing rotor (not shown). The sprockets 16 and 18 are rotatably secured to the frame 12 such that a right side section of the chain 20 is substantially vertical and a left side section of the chain is slightly inclined as shown in FIG. 1. A first station A for feeding the sub-assemblies s is located on the left side of the chain 20 and a second station B at which the sub-assemblies s are taken out is located on the right side thereof. The sprockets and chain move intermittently in the direction indicated by arrows in FIG. 1.

The chain 20 includes a plurality of attachments 20' equally spaced from each other, to which holders 26 are secured by bolts 28 extending therethrough. The holder 26 includes two vertical depressions 30 and a horizontal depression 32 adapted to receive and support the vials v therein as seats and two notches 34 for the purpose stated hereinafter. The holders 26 are connected to the attachments 20' so that the horizontal depression 32 is in the upper position when the holders 26 are located at the first station A.

Two feeding means 36 and 38 are provided at the first station A and are connected together by means of arms 40 and 42 and are slightly inclined downwardly toward the station A. Each feeding means comprises a pair of rails 44 and a guide plate 46 for supporting the sub-assemblies s in a row and a gate member 47 which opens to supply a sub-assembly s to the holder 26 when the holders 26 are aligned with the feeding means.

The feeding means 36 and 38 are laterally and vertically spaced so that when the holders 26 are stopped during one indexing operation, two feeding means 36 and 38 are respectively aligned with the seats of the two holders 26.

The arms 40 and 42 include two slots 48 respectively through which bolts 50 extend to connect the arms 40 and 42 to the frame 12. The arm 42 further includes a vertical slot to slidably engage the frame 12 and a projection 52 having a hole 54 within which a female thread is provided. A crank 56 is supported on the top of the frame 12 and the shaft 58 of the crank 56 having a male thread on the outer periphery thereof is engaged with the hole 54 so that when the handle 56 is turned, the height of the feeding means 36 and 38 is adjusted relative to the holders 26. After the height is adjusted, the bolts 50 are fastened to fix the feeding means to the frame 12.

At the station B, there is provided a turret 60 having a plurality of recesses at the outer periphery thereof to hold the vial v therein and a guide ring 62 to support the flange f. The distance between the turret 60 and the guide ring 62 may be adjusted so that the turret 60 can support different sizes of vials v. The turret 60 is consecutively indexed to receive simultaneously the two sub-assemblies s from the holders 26. Specifically, the turret 60 is rotationally indexed each time a distance corresponding to two recesses.

On the other side of the turret 60, a bifurcated arm 64 which is actuated by a motor (not shown) is provided for feeding the sub-assemblies s supported in the holders 26 to the turret 60. The arm 64 extends through a supporter 66 secured to the frame 12, and is generally situated in a retracted position as shown in FIG. 1. The arm 64 is actuated such that when the holder 26 and the turret 60 are aligned and stopped, the arm 64 is pushed forwardly through the notches 34 of the holder 26 to thereby bring the sub-assemblies s to the turret 60.

It is to be noted that the holders 26 are consecutively indexed and are always stopped at the same position, and when the holders are stopped and are aligned with the feeding means and the turret, the sub-assemblies are fed to the holders at the station A and are received at the station B.

The invention has been described with reference to a specific embodiment, but is to be understood that the description is illustrative and the invention is limited only by the appended claims.

What I claim is:

1. An apparatus for receiving articles at a first station and discharging them with different orientation at a second station, comprising an endless conveyor having article holding means affixed thereto at equally spaced apart locations in the direction of movement of the conveyor, each holding means having N article holders spaced normal to said direction, wherein N is an integer at least equal to two, N article feeders positioned to feed articles to separate article holders of each holding means, said feeders being spaced in said direction to be alignable with different holding means to enable simultaneous feeding of articles to the article holders of different holding means by the different feeders, and a holding station positioned adjacent said conveyor spaced from said feeders, for receiving articles from said article holders.

2. The apparatus of claim 1 wherein said endless conveyor has a vertically upward moving portion and a vertically downward moving portion, said feeders being positioned adjacent one of said portions and said receiving station being adjacent the other of said portions.

3. The apparatus of claim 2 wherein said receiving station comprises a rotary member, and means for simultaneously discharging articles from all the article holders of a given holding means substantially simultaneously to said rotary member, said rotary member being aligned with one of said holding means at the same time that others of said holding means are aligned with said feeders.

4. The apparatus of claim 3 wherein said endless conveyor is a chain, said holding means each comprise a body affixed to a separate link of said chain, and said article holders comprise recesses formed in said body and adapted to retain the articles therein.

5. The apparatus of claim 4 wherein the portion of said chain adjacent said feeders is inclined to the vertical, and said feeders comprise guide means inclined to the horizontal for directing articles through the respective article holders.

6. The apparatus of claim 5 wherein the guide means for the different feeders are spaced laterally from one another.

7. An apparatus for inverting articles and transporting the articles from a first station to a second station, comprising conveyor means situated in a substantially vertical plane and located between the first and second stations, said conveyor means including an endless rotational member and a plurality of holding members secured to said rotational member, said holding members being equally spaced from each other and each having therein at least first and second seats arranged in side by side relationship, at least first and second feeding means for feeding articles to the first and second seats, respectively, said feeding means being positioned laterally and vertically spaced from each other at the first station so that all the feeding means are simultaneously aligned with the corresponding holding means to each feed one article to a seat of the holding means at a predetermined position, receiving means for receiving the articles from the holding means at the second station, the orientation of the articles at the second station being different from the orientation of the articles at the first station, and transfer means for transferring the articles supported in the holding means to said receiving means at the second station, whereby said rotational member may be consecutively indexed to allow the holding members to simultaneously register with said feeding means and said receiving means, and when the rotational member is stopped, the articles may be fed to the holding members from the feeding means and to the receiving means from the holding means.

8. Apparatus as claimed in claim 7, comprising an indexing rotor to which said rotational member is adjustably secured.

9. Apparatus as claimed in claim 7, in which each feeding means includes a support member supporting the articles in a row and a gate member which allows the article to be fed to the seat when the holding means is aligned with the feeding means.

10. Apparatus as claimed in claim 9, in which all the feeding means are joined with each other, the apparatus including means for adjusting the location of said feeding means relative to the holding means.

11. Apparatus as claimed in claim 7 for inverting and transporting syringe sub-assemblies including syringe vials having hypodermic needles secured to one end and annular flanges at the other end thereof, in which said receiving means includes a turret having a plurality of recesses at the outer periphery thereof to hold the syringe vials therein, the turret including a guide ring to support the annular flanges of the syringe sub-assemblies, said guide ring and the rest of the turret being vertically relatively adjustable to support different size sub-assemblies.

12. Apparatus as claimed in claim 11, in which said transfer means includes a bifurcated arm to push the sub-assemblies supported in the seats to the recesses of the receiving means when the recesses and holding means are aligned, said turret being indexable a distance corresponding to two recesses.

* * * * *